United States Patent
Chen

(10) Patent No.: US 9,853,258 B2
(45) Date of Patent: Dec. 26, 2017

(54) GENERAL-PURPOSE BATTERY COMPARTMENT AND A ON-CAMERA FLASH UTILIZING BATTERIES OF GENERAL TYPES

(71) Applicant: Yueqing Chuangyi Photography Equipment Co., Ltd., Yueqing, Zhejiang (CN)

(72) Inventor: Qingyuan Chen, Yueqing (CN)

(73) Assignee: Yueqing Chuangyi Photography Equipment Co., Ltd., Yueqing (CN)

( * ) Notice: Subject to any disclaimer, the term of this patent is extended or adjusted under 35 U.S.C. 154(b) by 0 days.

(21) Appl. No.: 15/148,957

(22) Filed: May 6, 2016

(65) Prior Publication Data

US 2017/0033334 A1 Feb. 2, 2017

(30) Foreign Application Priority Data

Jul. 27, 2015 (CN) .................... 2015 2 0548604 U
Nov. 3, 2015 (CN) .................... 2015 2 0865630 U

(51) Int. Cl.
*H01M 2/10* (2006.01)
*F21K 5/06* (2006.01)
*H01M 2/30* (2006.01)
*H01M 10/052* (2010.01)

(52) U.S. Cl.
CPC ...... *H01M 2/1055* (2013.01); *G03B 15/0447* (2013.01); *H01M 2/1066* (2013.01); *H01M 2/30* (2013.01); *G03B 2215/0528* (2013.01); *G03B 2217/007* (2013.01); *H01M 10/052* (2013.01); *H01M 2220/30* (2013.01)

(58) Field of Classification Search
CPC ...... A47L 9/2284; A47L 11/4005; B62J 6/001; H01M 2/0202; H01M 2/02
USPC ............................................. 396/205
See application file for complete search history.

(56) References Cited

U.S. PATENT DOCUMENTS

| | | | | |
|---|---|---|---|---|
| 5,015,546 A * | 5/1991 | Dulaney | ............... | G06F 1/1626 429/1 |
| 5,926,659 A * | 7/1999 | Matsui | ................. | H01H 37/043 361/103 |
| 6,289,179 B1 * | 9/2001 | You | ........................... | G03B 7/26 307/150 |
| 8,318,334 B2 * | 11/2012 | Yang | ................... | H01M 2/1055 429/100 |
| 2004/0190889 A1 * | 9/2004 | Hagiuda | ................. | G03B 7/26 396/205 |
| 2015/0085463 A1 * | 3/2015 | Shum | ..................... | G03B 15/05 362/16 |

* cited by examiner

*Primary Examiner* — Clayton E Laballe
*Assistant Examiner* — Linda B Smith
(74) *Attorney, Agent, or Firm* — Arent Fox LLP

(57) ABSTRACT

A general-purpose battery compartment, comprising a compartment body that can receive either lithium batteries or AA batteries therein and separate the AA batteries received therein to prevent contact therebetween; wherein spring leafs used to connect with the lithium batteries or the AA batteries are provided within the compartment body, and contact points of anode and cathode of the lithium batteries are respectively connected to the two spring leafs that are connected to output terminals of anode and cathode of the battery compartment.

6 Claims, 17 Drawing Sheets

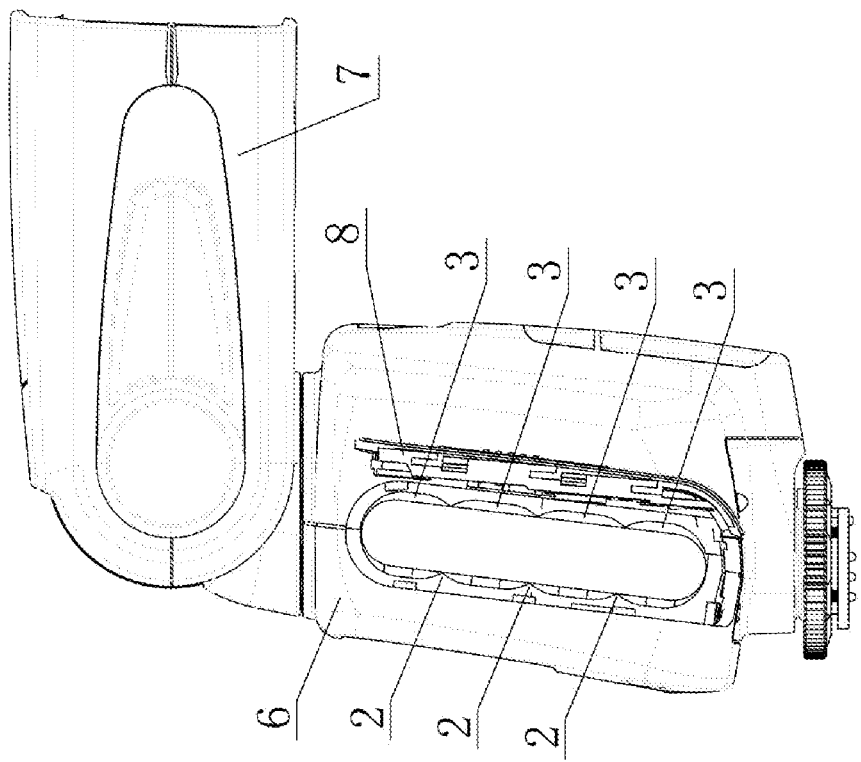
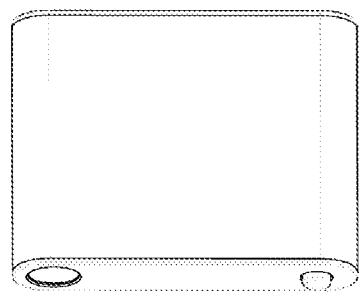
Fig. 4
Fig. 5

GENERAL-PURPOSE BATTERY COMPARTMENT AND A ON-CAMERA FLASH UTILIZING BATTERIES OF GENERAL TYPES

TECHNICAL FIELD OF THE INVENTION

The present invention relates to a general-purpose battery compartment and an on-camera flash utilizing batteries of general types mainly used in the field of electronic products.

BACKGROUND

As four AA batteries commercially available are used today as a power source for most of on-camera flashes, the cavity to accommodate the batters typically consists of four small independent AA battery-containing cavities. Although such an arrangement is able to prevent physical contacts therebetween which would otherwise disrupt normal use (the worn surfaces of batteries are liable to trigger short circuit when they contact each other), its problem lies in long recycle time and less number of flashes.

The Chinese utility model patent with the No. 201320787015.8 discloses on-camera flash with a double-battery structure including a holder and a head which is hinged to the holder and can rotate relative to the holder; a battery-containing cavity is formed in the holder, a cover is provided at the inlet of the battery-containing cavity; a first battery cartridge accommodating some AA batteries is also included, at least first input electrical plug is contained in the battery-containing cavity; when the first battery cartridge is installed in the battery-containing cavity, a first output electric plug of the first battery cartridge and the first input electrical plug form an electrical connection which is characterized by including a second battery cartridge, and the second battery cartridge includes a lithium battery and can replace the first battery cartridge to plug in the battery-containing cavity; a second output electrical plug is installed on a housing of the second battery cartridge which is electrically connected with the control circuit installed in the holder via the second output electrical plug, thus solving the problems of long recycle time and less number of flashes. Such a structure, however, is complex and inconvenient because it requires the first battery cartridge for placing the AA batteries when using AA batteries, and also it involves two steps to install batteries during the use thereof.

SUMMARY

In efforts to overcome the defect described above, the technical problem to be solved by the present invention is to provide a simply-structured, easy-to-use general battery compartment and an on-camera flash utilizing batteries of general types.

The effect of the present invention is achieved through the technical solutions below:

A general-purpose battery compartment, comprising a compartment body that can receive either lithium batteries or AA batteries therein and separate the AA batteries received therein to prevent contact therebetween; wherein spring leafs used to connect with the lithium batteries or the AA batteries are provided within the compartment body, and contact points of anode and cathode of the lithium batteries are respectively connected to the two spring leafs that are connected to output terminals of anode and cathode of the battery compartment.

A plurality of raised platforms are provided on inner wall of the compartment symmetrically, which can support and position the lithium batteries and position the AA batteries and prevent two adjacent AA batteries from contacting each other.

The raised platforms comprise:

a support mechanism for supporting the lithium batteries, providing a heat dissipation gap between the inner wall of the compartment body and lithium batteries, and forming at least two cavities to accommodate AA batteries within the compartment body;

a positioning mechanism located on the inner wall of the cavity which can mate with AA batteries to achieve positioning of AA batteries and separation of two adjacent AA batteries.

The positioning mechanism is an arcuate holder and its positioning surface presents an arcuate concave matching with external surface of AA batteries.

There are three pairs of the supporting mechanisms, three of them are positioned on an inner wall of the compartment body on one side and the other three are positioned on the inner wall on an opposite side, thereby providing four cavities arranged side by side within the compartment body.

A through-hole is provided at least on one side wall of the compartment body and an elastomeric separation unit is installed on the back side of the side wall having the through-hole, wherein the elastomeric separation unit extends into the compartment body through the through-hole to separate two adjacent AA batteries and can be forced to retract to the back side of the side wall while installing lithium batteries.

The elastomeric separation unit comprises a plurality of guideposts mounted on the back side of the side wall, an elastomeric separation plate mounted on the back side of the side wall through the guideposts and able to freely move axially along the guideposts, a stop mounted on the free end of the guidepost, a spring sleeved outside the guidepost with two ends acting against the elastomeric separation plate and the stop, and a separator mounted on the elastomeric separation plate to separate the two adjacent AA batteries; and the spring and the separator are positioned at two sides of the elastomeric separation plate.

The separator is at least one elongate separation rib provided on the elastomeric separation plate and is arranged parallel to the length of the installed AA batteries.

The separator is at least one separation stand provided on the separation plate and its two sides are arcuate concave surfaces that match the external surface of the AA battery, and a separation groove is provided between two separation stands for holding the AA battery; and the separation stand is positioned at the entrance or center of the compartment body.

A separation plug-in component is detachably installed within the compartment body to divide the compartment body into several cavities when receiving AA batteries, to separate two adjacent AA batteries, and can be removed from the compartment to provide space for receiving lithium battery.

At least one chute parallel to the insertion direction of the plug-in component is provided on the inner wall of the compartment body, and a sliding block matching the chute is provided at the corresponding position at the separation plug-in component to position the separation plug-in component.

At least one raised strip parallel to the insertion direction of the plug-in component is provided on the inner wall of the compartment body, and a groove matching the raised line is provided at the corresponding position at the separation plug-in component to position the separation plug-in component.

The separation plug-in component comprises a separation sleeve with a cross section shaped like number 8 and its two sides are respectively provided with a separation board whose cross section is in a form of a circular arc, the separation sleeve and the separation board are arranged side by side and the two separation boards are respectively arranged tangentially relative to the separation sleeve.

The lithium battery has a flat square structure.

An on-camera flash utilizing general-purpose batteries, comprising a lamp holder and a lamp head which are hinged together, wherein the lamp holder comprises a battery compartment described above and the battery compartment is provided with a cover.

Equipped with the above structure, the present invention has the following benefits in comparison with the prior art: 1. the battery compartment in the present invention can accommodate either a lithium battery or a AA battery, and thus has a simpler structure relative to the prior art with the first battery box dedicatedly for accommodating AA batteries eliminated, so that it is more convenient to be used for installing batteries. 2. Raised platforms are provided on the inner wall of the compartment body for supporting and fixing the square lithium batteries within the compartment body such that a heat dissipation gap is formed between the inner wall and the batteries so as to achieve a better effect in battery heat dissipation. Meanwhile, the raised platforms enable for at least two cavities within the compartment body for separately accommodating AA batteries in such a manner that two adjacent AA batteries in the two cavities are separated to avoid contact with each other and thus to prevent short circuit arising from the contact between batteries with worn surfaces; in other words, since either normal AA batteries or square lithium batteries can be received in the battery compartment body without a need for a battery box (for accommodating AA battery), the universality and compatibility of the products are improved and the compartment has a simpler structure easier for use. 3. With the raised platforms comprising a supporting mechanism and a positioning mechanism, the gap for heat dissipation is enlarged as much as possible by supporting and positioning lithium batteries by the supporting mechanism and positioning AA batteries by the positioning mechanism, so as to achieve a better heat dissipation effect. 4. A through-hole is provided at least on one side wall of the compartment body and an elastomeric separation unit is installed on the back side of the side wall having the through-hole. The elastomeric separation extends into the compartment body through the through-hole to separate two adjacent AA batteries so as to avoid contact with each other and thus to prevent short circuit arising from the contact between batteries with worn surfaces, and can, at the same time, be forced to retract to the back side of the side wall while installing lithium batteries. Such an ingenious design allows for direct installment of normal AA batteries and square lithium batteries and thus enhances the universality and compatibility of the product. 5. A separation plug-in component is detachably installed within the compartment body, wherein the plug-in component is installed within the compartment body when AA batteries are to be installed, so as to form four separate cavities for installing AA batteries so that contact between batteries can be avoided, which would otherwise disrupt normal use (because contact between batteries with worn surfaces tends to trigger short circuit); and when lithium batteries are to be installed, the separation plug-in component can be detached from the compartment body. Therefore, the structure is simple and easy for use. 6. A structure in the form of a chute (groove) and a sliding block (raised strip) is adopted for the inner wall of the compartment body and the separation plug-in component, which allows for not only positioning for the separation plug-in component but also a convenient installment. 7. No modification is required for the control circuit of the traditional on-camera flash, thereby ensuring a low production cost.

BRIEF DESCRIPTION OF THE DRAWINGS

FIG. 4 is a structural drawing of the on-camera flash according to the first embodiment when using the square-shaped lithium batteries.

FIG. 5 is a structural drawing of the square-shaped lithium batteries in FIG. 4.

DESCRIPTION OF THE EMBODIMENTS

Detailed descriptions about the present invention are provided below in connection with the drawings.

First Embodiment

Figure 1:
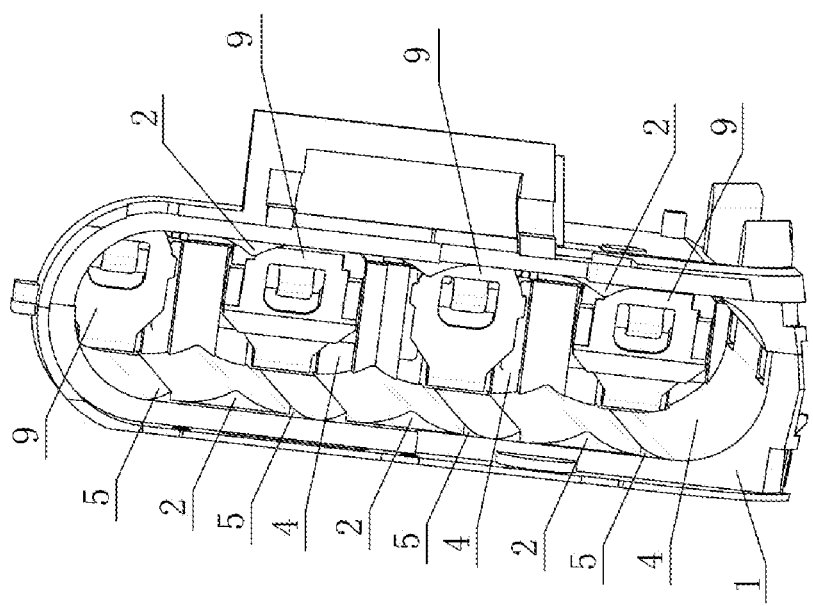
FIG. 1 is a structural drawing of the battery compartment according to the first embodiment of the present invention.

As shown in FIG. 1, a general-purpose battery compartment comprises a compartment body 1 that can receive either lithium batteries or AA batteries and separate the AA batteries installed inside to prevent their contact with each other; wherein the spring leafs 9 used to electrically connect the lithium batteries and the AA batteries are provided within the compartment body 1. As shown in FIG. 5, the lithium battery has a flat square structure, and the contact points of anode and cathode of the lithium batteries are respectively corresponding to the two spring leafs 9 that are connected to the output terminal of the anode and cathode of the battery compartment; and the contacts of the anode and cathode of each AA battery respectively correspond to the two springs leafs 9. In the first embodiment, the battery compartment 1 may accommodate four AA batteries in total and is provided with eight springs leafs 9, wherein the two springs leafs 9 connected to the output terminals of the anode and cathode of the battery compartment correspond to and connect with the anode and cathode of the lithium batteries.

Several raised platforms are provided within the compartment body 1 which can not only support and position the lithium batteries and also position the AA batteries and prevent contact between adjacent AA batteries. In the present embodiment, the raised platforms are arranged on the inside wall of the compartment body symmetrically. It comprises:

three pairs of support mechanisms 2, three of which are provided on the inner wall of the compartment 1 on one side, and the other three of which are provided on the inner wall on the opposite side, thereby providing four cavities 4 arranged side by side within the compartment body 1 to accommodate AA batteries. Meanwhile, the supporting mechanisms 2 are able to support and position the lithium batteries, providing a heat dissipation gap between the inner wall of the compartment body 1 and lithium batteries.

a positioning mechanism 5 located on the inner wall of the cavity 4, and adaptive to AA batteries so as to achieve the positioning of AA batteries and separation between two adjacent AA batteries. In the first embodiment, the positioning mechanism 5 is an arcuate holder and its positioning surface presents an arcuate concave surface matching with external surface of AA batteries.

In the absence of a battery cartridge (for accommodating AA battery), the compartment 1 with the structure above improves the universality and compatibility of products by accommodating normal AA and square lithium batteries and thus allows an convenience for the consumers with a simpler structure. Also, when installing AA batteries, it can prevent the contact of two adjacent AA batteries to ensure their normal functions (the worn surface of batteries are liable to trigger short circuit when they contact each other).

Figure 2:
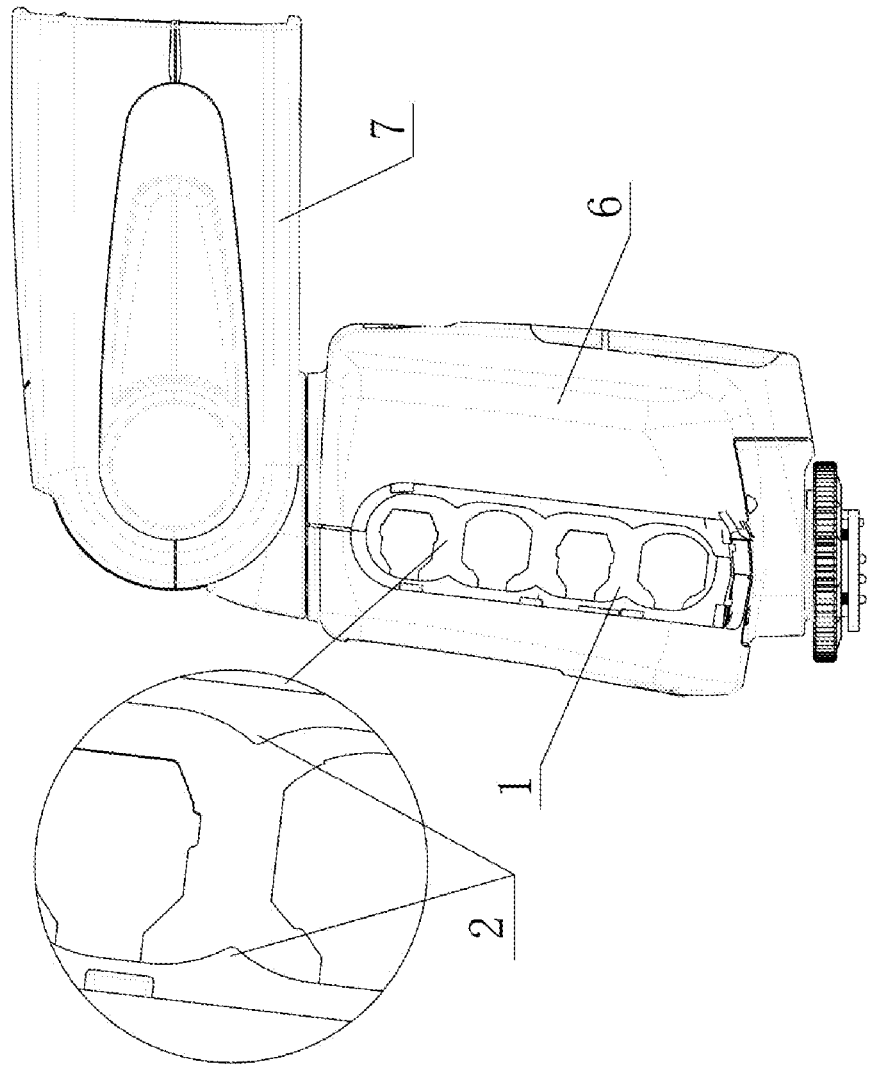
FIG. 2 is a structural drawing of the on-camera flash according to the first embodiment.
Figure 3:
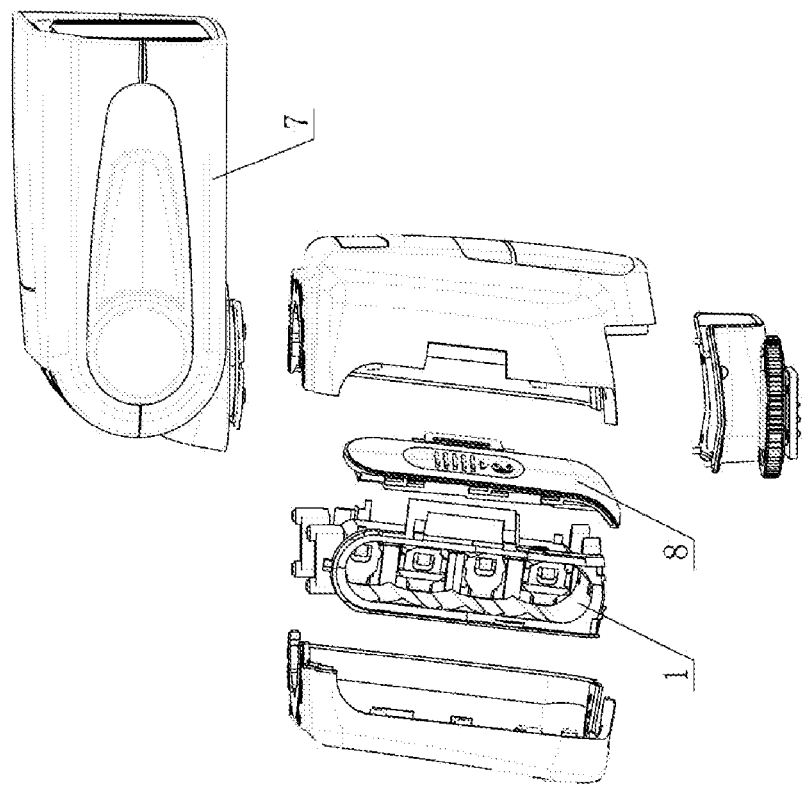
FIG. 3 is an explosive view of the on-camera flash according to the first embodiment.

According to FIGS. 2 and 3, an on-camera flash utilizing batteries of general types of the present embodiment includes a holder 6 and a head 7 which are hinged to each other. The holder 6 comprises a battery compartment aforesaid that is provided with a cover 8.

As illustrated in FIG. 4, when a square lithium battery is being used, its two sides are supported by the three pairs of supporting mechanisms 2 and form a heat dissipation gap 3 between the inner wall of compartment body 1 and square lithium batteries. Moreover, their contact points of anode and cathode contact respectively with the spring leafs 9 (two spring leafs as the output terminals of anode and cathode of the battery compartment) within the compartment body 1 to enable an electric connection.

Figure 7:
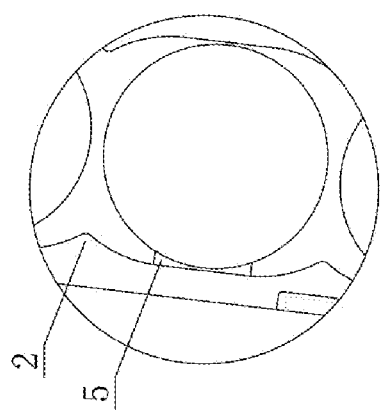
FIG. 7 is an enlarged viewing of the section A of FIG. 6.
Figure 6:
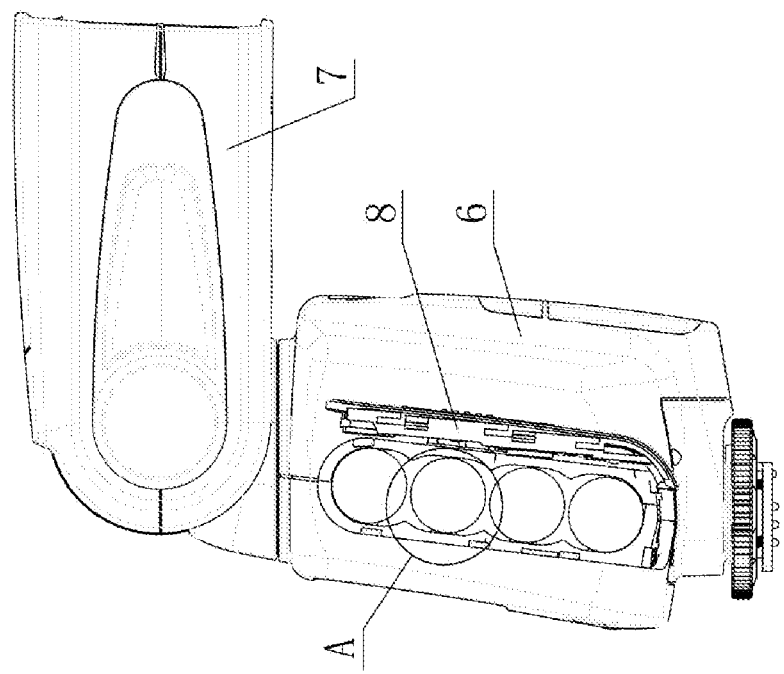
FIG. 6 is a structural drawing of the on-camera flash according to the first embodiment when using AA batteries.
Figure 9:
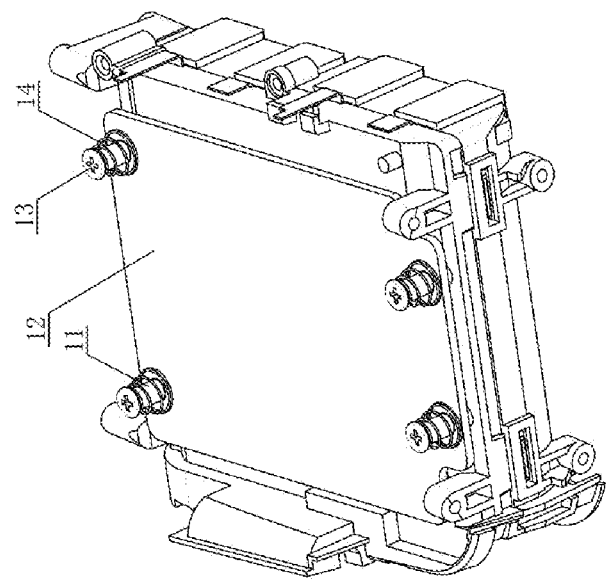
FIG. 9 is a structural drawing of FIG. 8 from another angle.
Figure 8:
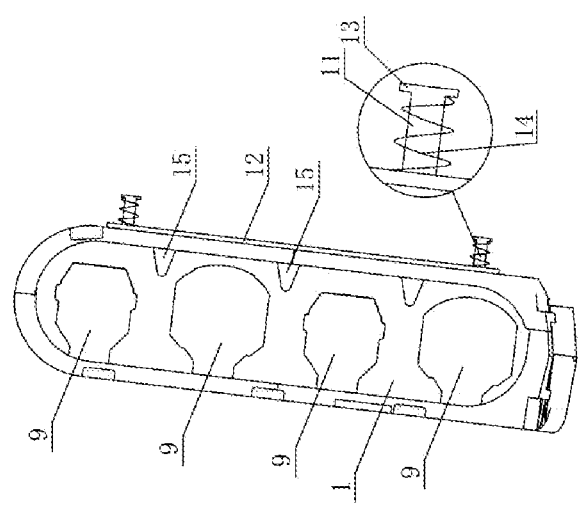
FIG. 8 is a structural drawing of the battery compartment according to the second embodiment.
Figure 10:
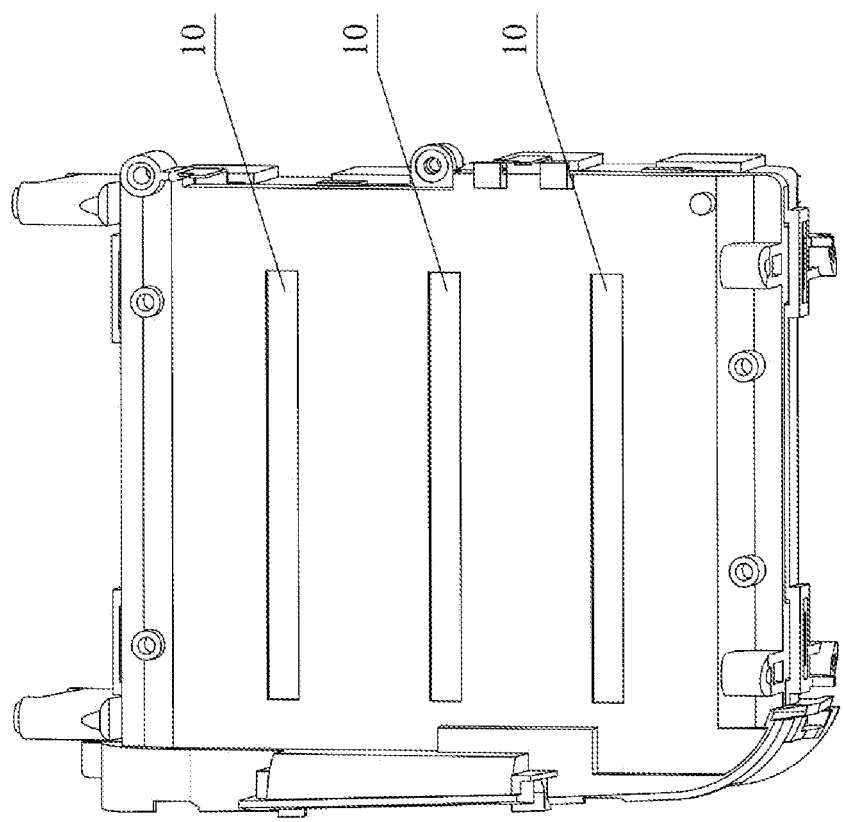
FIG. 10 is a structural drawing of the side wall for mounting an elastomeric separation unit according to the second embodiment.
Figure 12:
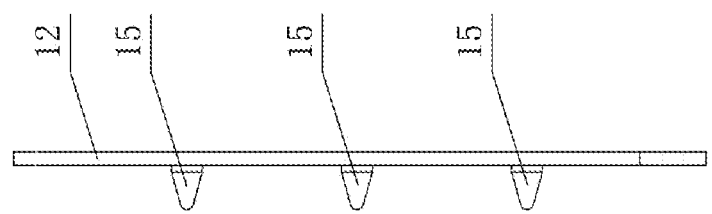
FIG. 12 shows right side view of FIG. 11.
Figure 11:
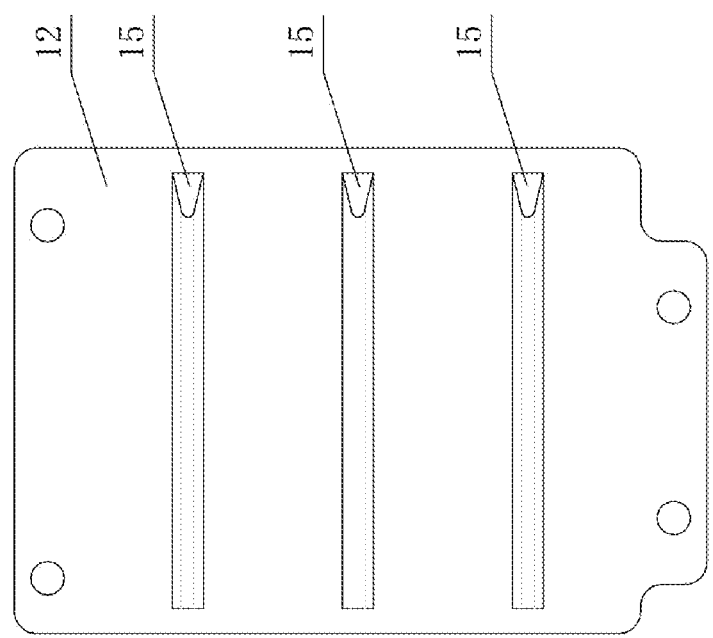
FIG. 11 shows a front view of the elastomeric separation plate according to the second embodiment.

According to FIGS. 6 and 7, when an ordinary AA batteries are employed, their peripheries are supported on the positioning mechanism 5 to separate the AA batteries in the two adjacent cavities (no contact therebetween). In addition, the anode and cathode of each AA battery contact respectively with the spring leafs 9 to enable an electric connection.

Second Embodiment

As shown in FIGS. 8-12, the general-purpose battery compartment structure in the second embodiment is substantially identical to the first embodiment except for the following aspects: through-holes 10 are provided at least on one side wall of the compartment body 1 and an elastomeric separation unit is installed on the back side of the side wall having through-holes, which extends into the compartment body 1 through the through-holes 10 to separate two adjacent AA batteries and can be forced to the back side of the side wall while installing lithium batteries.

In the second embodiment, the elastomeric separation unit comprises a plurality of guideposts 11 mounted on the back side of the side wall, an elastomeric separation plate 12 mounted on the back side of the side wall through the guideposts 11 and able to move axially freely along the guideposts 12, a stop 13 mounted on the free end of the guideposts 11, springs 14 sleeved outside the guideposts 11 with the two ends acting against the elastomeric separation plate 12 and the stop 13, and a separator mounted on the elastomeric separation plate 12 and separating two adjacent AA batteries by extending into the compartment body 1 through the through-holes 10; the springs 14 and the separator are positioned at two sides of the elastomeric separation plate 12; and the separator is three strip-shaped separation ribs 15 provided on the elastomeric separation plate 12 and the ribs 15 are arranged parallel to the length direction of the installed AA batteries, dividing the compartment 1 into four cavities to accommodate AA batteries.

Figure 13:
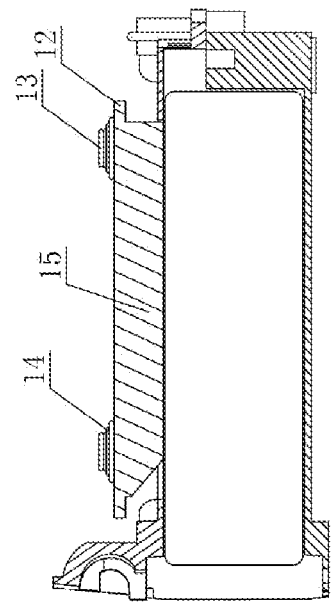
FIG. 13 shows a structure diagram of the second embodiment when the square-shaped lithium batteries are installed of the second embodiment.

As shown in FIG. 13, when the compartment 1 is installed with the square batteries, the elastomeric separation plate 12 and the separation ribs 15 are forced to the back side of side wall. The lithium batteries occupy the internal cavity of the compartment 1 and are positioned by the inner wall of compartment body 1. Moreover, the contact points of anode and cathode of lithium batteries contact respectively with the spring leafs 9 (two spring leafs as the output terminals of anode and cathode of the battery compartment) within the compartment body 1 to enable an electric connection.

Figure 14:
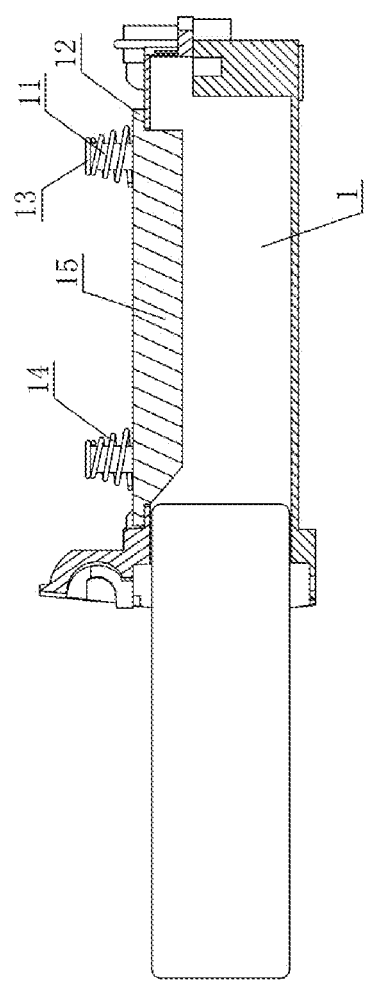
FIG. 14 shows a structure diagram wherein the square lithium batteries are removed according to the second embodiment when the square-shaped lithium batteries are removed.

As shown in FIG. 14, when the lithium batteries are removed, the separation ribs 15, under the force of springs 14, extend into compartment 1 through through-holes 10 to divide the compartment 1 into four cavities to accommodate AA batteries.

Figure 15:
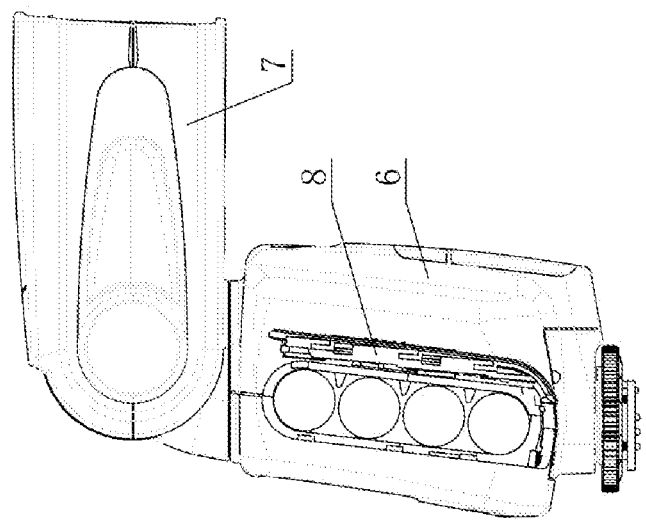
FIG. 15 is a structural drawing of on-camera flash according to the second embodiment.

As shown in FIG. 15, the Embodiment illustrates an on-camera flash utilizing batteries of general types, including a holder 6 and a head 7 which are hinged to each other, and the holder 6 comprises a battery compartment aforesaid that is provided with a cover 8.

Figure 16:
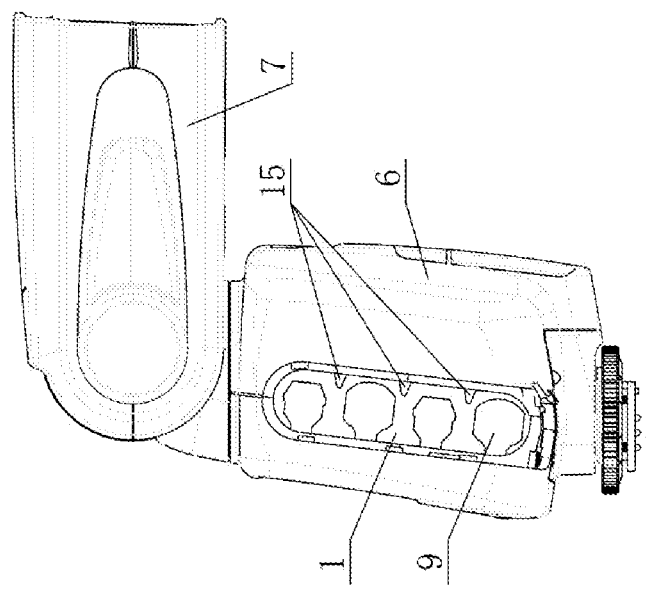
FIG. 16 is a structural drawing of the on-camera flash according to the second embodiment when using AA batteries.
Figure 19:
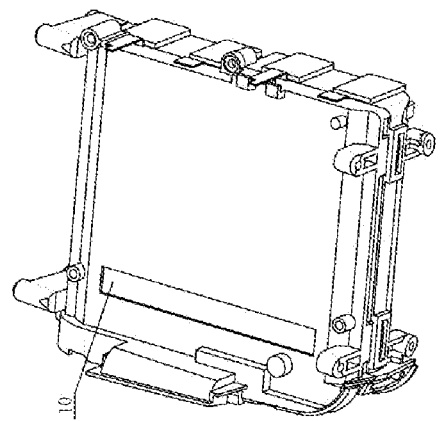
FIG. 19 shows a structural drawing of FIG. 18 with the elastomeric separation unit removed.
Figure 18:
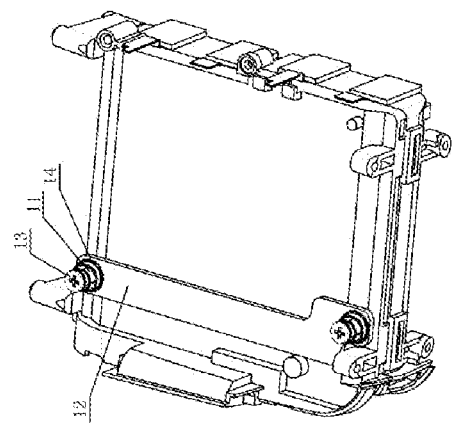
FIG. 18 shows a structural drawing of FIG. 17 from another perspective.
Figure 17:
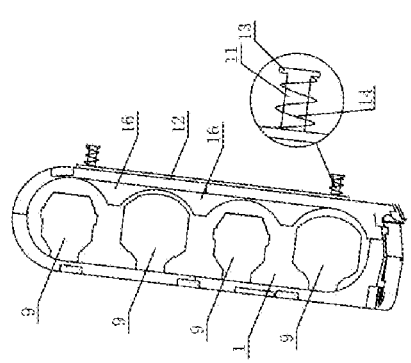
FIG. 17 illustrates a structural drawing of the battery compartment according to the third embodiment.

As shown FIG. 16, when an ordinary AA battery is employed, each AA battery is separated by separation ribs 15 to keep the AA batteries in the two adjacent cavities from contacting. In addition, the anode and cathode of each AA battery contact respectively with the spring leafs 9 to enable an electric connection.

Third Embodiment

As shown in FIGS. 17-21, the third embodiment is substantially identical to the second embodiment 2 expect for the following aspects: the separator is at least one separation stand 16 provided on the elastomeric separation plate 12 and its two sides are arcuate concave surfaces that match the external surfaces of AA batteries, and the separation grooves are formed between two adjacent separation stands 16 for holding AA batteries; and the separation stands 16 are positioned at the entrance or center of the compartment.

Figure 22:
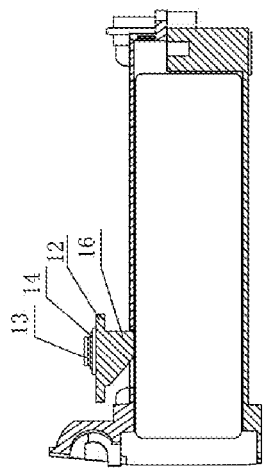
FIG. 22 shows a structure diagram of the third embodiment when square-shaped lithium batteries are installed.
Figure 21:
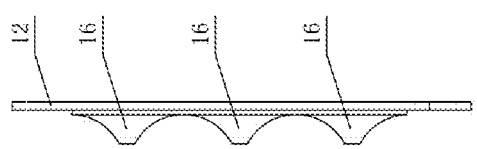
FIG. 21 shows right side view of FIG. 20.
Figure 20:
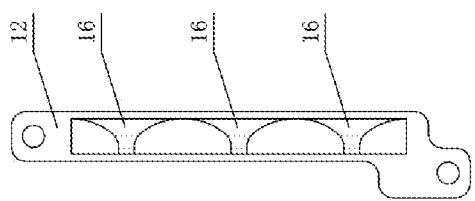
FIG. 20 shows a front view of the elastomeric separation plate according to the third embodiment.

As shown in FIG. 22, when the compartment 1 is installed with the square lithium batteries, the elastomeric separation plate 12 and the separation stands 16 are forced to the back side of side wall. The lithium batteries occupy the internal cavity of the compartment 1 and are positioned by the inner wall of compartment body 1. Moreover, the contact points of anode and cathode of lithium batteries contact respectively with the spring leafs 9 (two spring leafs as the output terminals of anode and cathode of the battery compartment) within the compartment body 1 to enable an electric connection.

Figure 23:
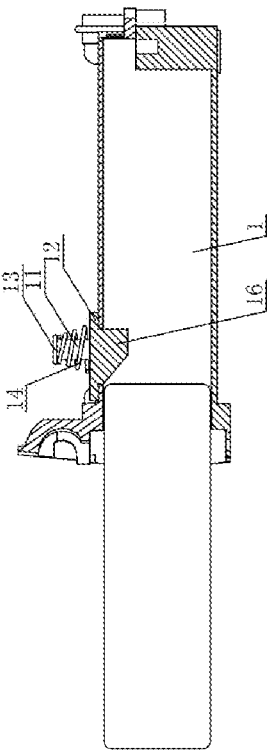
FIG. 23 shows a structure diagram of the third embodiment when the square-shaped lithium batteries are removed.

As shown in FIG. 23, when the lithium batteries are removed, the separation stands 16, under the force of springs 14, extend into compartment body 1 through through-holes 10 to divide the compartment body 1 into four cavities to accommodate AA batteries.

Figure 24:
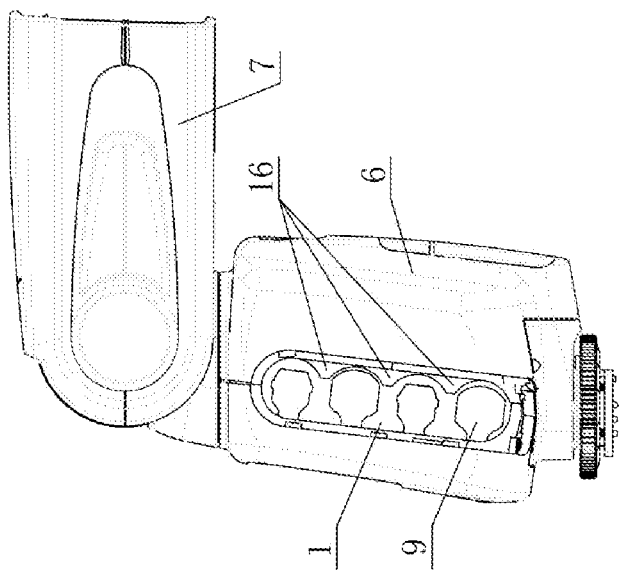
FIG. 24 is a structural drawing of on-camera flash according to the third embodiment.

As shown in FIG. 24, this embodiment illustrates an on-camera flash utilizing batteries of general types, including a holder 6 and a head 7 which are hinged to each other, and the holder 6 comprises a battery compartment aforesaid that is provided with a cover 8.

Figure 25:
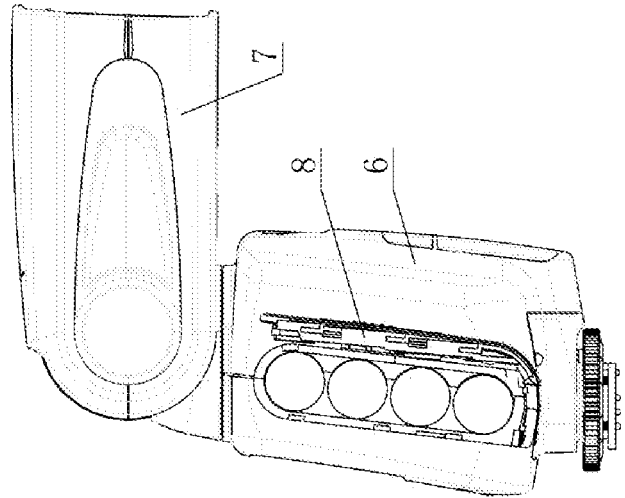
FIG. 25 is a structural drawing of the on-camera flash according to the third embodiment when using AA batteries.

As shown FIG. 25, when an ordinary AA battery is employed, each AA battery is separated by separation stands 16 to keep the AA batteries in the two adjacent cavities from contacting. In addition, the anode and cathode of each AA battery contact respectively with the spring leafs 9 to enable an electric connection.

Fourth Embodiment

Figure 26:
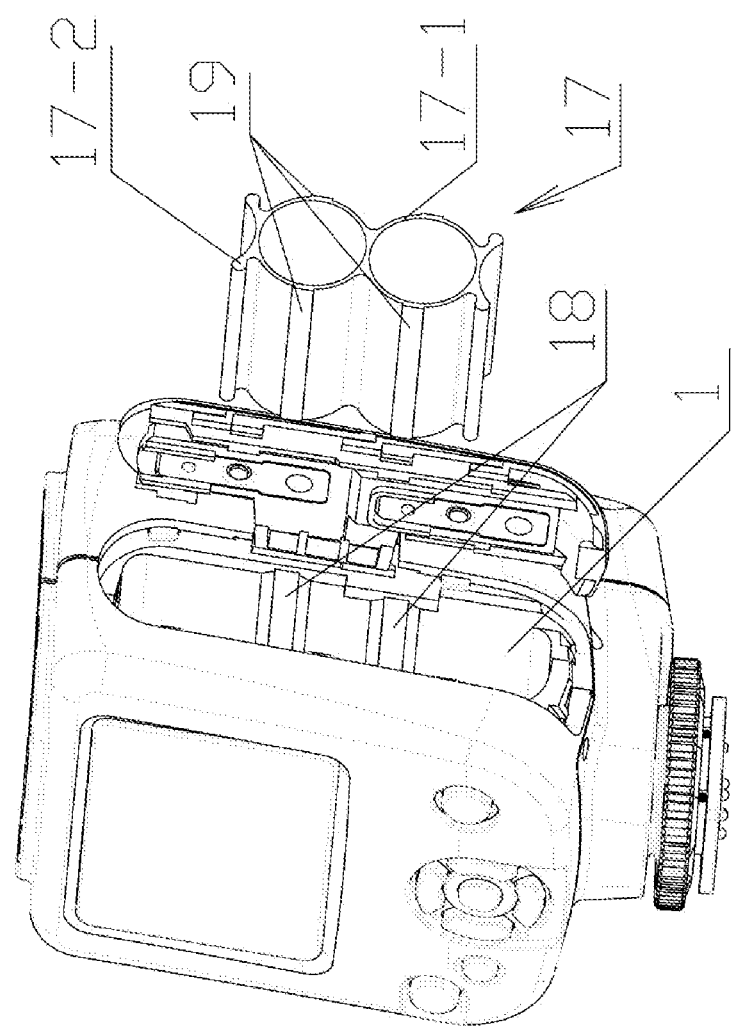
FIG. 26 illustrates a structural drawing of battery compartment according to the fourth embodiment.

As shown in FIG. 26, the fourth embodiment is substantially identical to the first embodiment except for the aspects below: a separation plug-in component 17 is detachably installed within the compartment body 1; during the installment of AA batteries, the plug-in component installed within the compartment body 1 separates the compartment 1 into a plurality of cavities (slightly larger than AA batteries) to install AA batteries so as to keep two adjacent AA batteries from contacting; the separation plug-in component 17 can be removed from the compartment body 1 to provide space for lithium battery installment; at this moment, the lithium batteries occupy the internal cavity of the compartment 1 and are positioned by the inner wall of compartment body 1. Moreover, the contact points of anode and cathode of lithium batteries contact respectively with the spring leafs 9 (two spring leafs as the output terminals of anode and cathode of the battery compartment) within the compartment 1 to enable an electric connection.

In this embodiment, at least one chute 18 parallel to the insertion direction of the plug-in component 17 is provided on the inner wall of the compartment body 1, and a sliding block 19 matching the chute 18 is provided at the corresponding position on the separation plug-in component 17 to position the separation plug-in component 17 while facilitating the installation of the separation plug-in component 17.

The separation plug-in component 17 comprises a separation sleeve 17-1 with a cross section shaped like number 8 and its two sides are respectively provided with a separation board 17-2 whose cross section is in a form of a circular arc, the separation sleeve 17-1 and separation board 17-2 are arranged side by side and the two separation boards 17-2 are respectively arranged tangentially relative to the separation sleeve 17-1.

Figure 27:
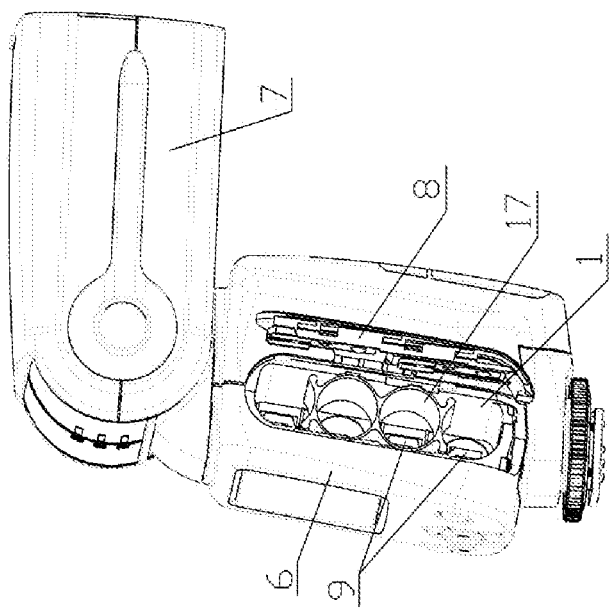
FIG. 27 shows a structural drawing of on-camera flash according to the fourth embodiment.

As shown in FIG. 27, this embodiment illustrates an on-camera flash utilizing batteries of general types, including a holder 6 and a head 7 which are hinged to each other, and the holder 6 comprises a battery compartment in the Embodiment that is provided with a cover 8.

Figure 28:
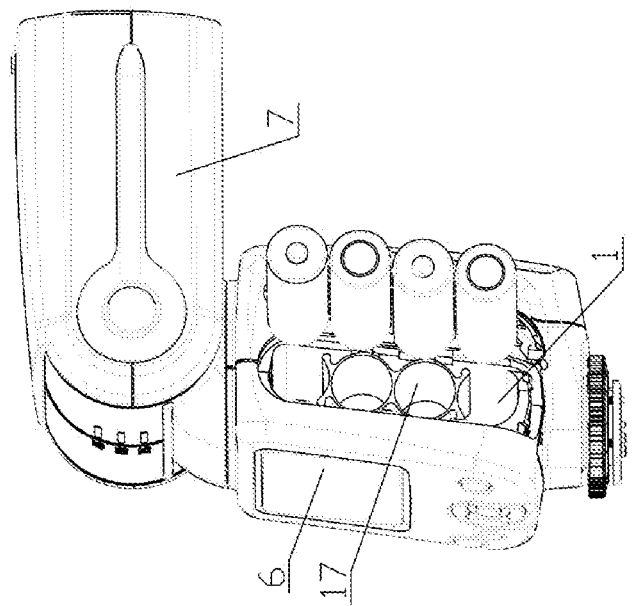
FIG. 28 shows a structural drawing of the on-camera flash of FIG. 27 when using AA batteries.
Figure 30:
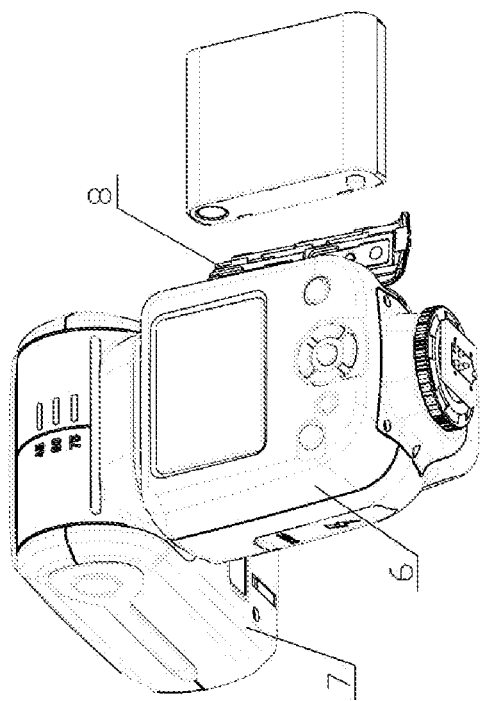
FIG. 30 shows a state when the lithium batteries in FIG. 29 are removed.
Figure 29:
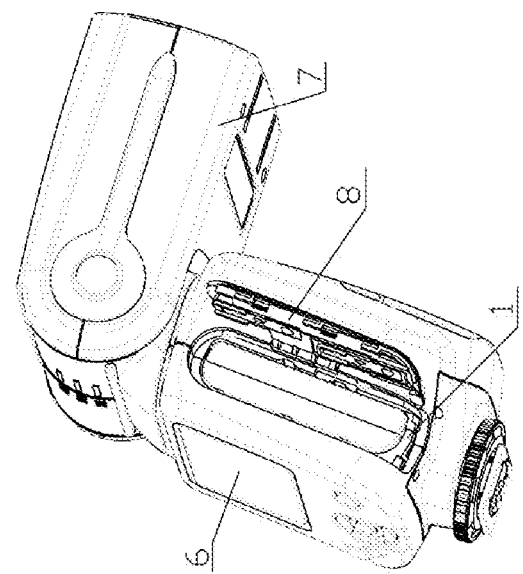
FIG. 29 shows a structural drawing of the on-camera flash of FIG. 27 when using lithium batteries.

As shown in FIGS. 28-30, when it is necessary to install AA batteries, the plug-in component 17 can be installed within the compartment 1 to form four separate cavities for installing AA batteries so as to avoid contact between adjacent batteries which would otherwise disrupt normal use (the worn surface of batteries are liable to trigger short circuit when they contact each other); meanwhile, the anode and cathode of AA batteries contact respectively with the spring leafs 9 to enable an electric connection. Also, the separation plug-in component 17 can be detached from the compartment 1 when it is required to install lithium batteries, providing a simple structure and easy application.

Fifth Embodiment

Figure 31:
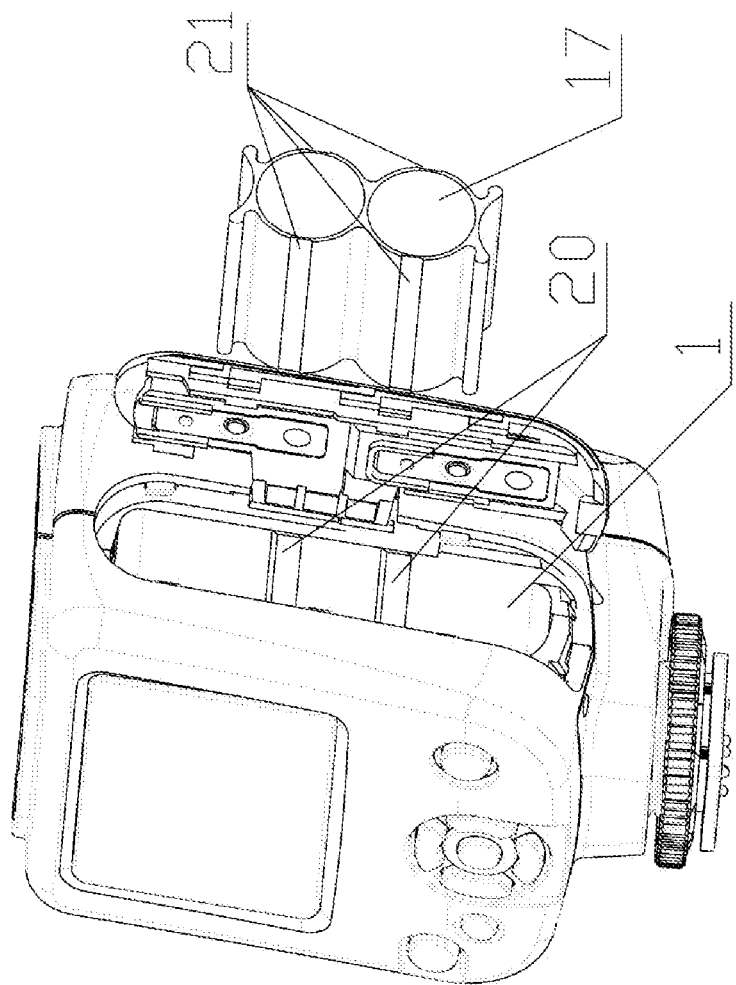
FIG. 31 illustrates a structural drawing of the battery compartment according to the fifth embodiment.

As shown in FIG. 31, the fifth embodiment is substantially identical to Embodiment 4 except for the aspects below: at least one raised strip 20 parallel to the insertion direction of the plug-in component 17 are provided on the inner wall of the compartment body 1, and grooves 21 matching the raised line 20 are provided at the corresponding position on the separation plug-in component 17 to position the separation plug-in component 17 while facilitating the installment of the separation plug-in component 17.

This embodiment relates to an on-camera flash utilizing batteries of general types, including a holder 6 and a head 7 which are hinged to each other, and the holder 6 comprises a battery compartment in the Embodiment that is provided with a cover 8 above. A hot shoe is provided on the holder 6 to match a hot shoe adaptor.

I claim:

1. A general-purpose battery compartment, comprising a compartment body that can receive either lithium batteries or AA batteries therein and separate the AA batteries received therein to prevent contact therebetween; wherein spring leafs used to connect with the lithium batteries or the AA batteries are provided within the compartment body, and contact points of anode and cathode of the lithium batteries are respectively connected to the two spring leafs that are connected to the output terminals of anode and cathode of the battery compartment; and wherein a separation plug-in component is detachably installed within the compartment body to divide the compartment body into several cavities when receiving AA batteries, to separate two adjacent AA batteries, and can be removed from the compartment body to provide space for receiving lithium batteries.

2. The general-purpose battery compartment according to claim 1, wherein at least one chute parallel to the insertion direction of the plug-in component is provided on the inner wall of the compartment body, and a sliding block matching the chute is provided at a corresponding position at the separation plug-in component to position the separation plug-in component.

3. The general-purpose battery compartment according to claim 1, wherein the separation plug-in component comprises a separation sleeve with a cross section shaped like number 8 and its two sides are respectively provided with a separation board whose cross section is in a form of a circular arc, the separation sleeve and separation board are arranged side by side and the two separation boards are respectively arranged tangentially relative to the separation sleeve.

4. An on-camera flash utilizing general-purpose batteries, comprising a lamp holder and a lamp head which are hinged together, wherein the lamp holder comprises a battery compartment and the battery compartment is provided with a cover, wherein the battery compartment comprises a compartment body that can receive either lithium batteries or AA batteries therein and separate the AA batteries received therein to prevent contact therebetween; wherein spring leafs used to connect with the lithium batteries or the AA batteries are provided within the compartment body, and contact points of anode and cathode of the lithium batteries are respectively connected to the two spring leafs that are connected to the output terminals of anode and cathode of the battery compartment; and wherein a separation plug-in component is detachably installed within the compartment body to divide the compartment body into several cavities when receiving AA batteries, to separate two adjacent AA batteries, and can be removed from the compartment body to provide space for receiving lithium batteries.

5. The on-camera flash utilizing general-purpose batteries according to claim 4, wherein at least one chute parallel to the insertion direction of the plug-in component is provided on the inner wall of the compartment body, and a sliding block matching the chute is provided at a corresponding position at the separation plug-in component to position the separation plug-in component.

6. The on-camera flash utilizing general-purpose batteries according to claim 4, wherein the separation plug-in component comprises a separation sleeve with a cross section shaped like number 8 and its two sides are respectively provided with a separation board whose cross section is in a form of a circular arc, the separation sleeve and separation board are arranged side by side and the two separation boards are respectively arranged tangentially relative to the separation sleeve.

* * * * *